(12) United States Patent
Warkotsch

(10) Patent No.: US 6,338,273 B1
(45) Date of Patent: Jan. 15, 2002

(54) CLAMPING DEVICE FOR FIXING A WHEEL RIM OF A VEHICLE WHEEL TO A SHAFT OF A BALANCING MACHINE

(75) Inventor: Horst Warkotsch, Burgwedel (DE)

(73) Assignee: Hawek Auswuchetechnik Horst Warkotsch GmbH, Burgwedel (DE)

( * ) Notice: Subject to any disclaimer, the term of this patent is extended or adjusted under 35 U.S.C. 154(b) by 0 days.

(21) Appl. No.: 09/769,728

(22) Filed: Jan. 26, 2001

Related U.S. Application Data

(63) Continuation of application No. PCT/EP99/05379, filed on Jul. 27, 1999.

(51) Int. Cl.[7] .............................................. G01M 1/06
(52) U.S. Cl. ...................................................... 73/487
(58) Field of Search ..................................... 73/487, 66

(56) References Cited

U.S. PATENT DOCUMENTS

| | | | |
|---|---|---|---|
| 4,354,386 A | 10/1982 | Newton | |
| 5,900,548 A | * 5/1999 | Buzzi | ........................... 73/487 |
| 5,948,980 A | * 9/1999 | Rossteuscher | ............... 73/487 |

FOREIGN PATENT DOCUMENTS

| | | |
|---|---|---|
| AT | 378 430 | 8/1985 |
| DE | 1 928 054 | 10/1970 |
| DE | 28 07 343 | 8/1978 |
| DE | 38 15 876 | 11/1989 |

OTHER PUBLICATIONS

"Typenspannflansche", Haweka Auswuchttechnik Horst Warkotsch GMBH, 3 pages, 10/94.
Internationaler Vorläufiger Prüfungsbericht for PCT/EP99/05379, 5 pages, dated Mar. 9, 2000.
Published PCT Application No. WO 00/06984 to Warkotsch, dated Feb. 10, 2000, and accompanying International Search Report dated Oct. 18, 1999.

* cited by examiner

*Primary Examiner*—Richard A. Moller
(74) *Attorney, Agent, or Firm*—Shlesinger, Arkwright & Garvey LLP

(57) ABSTRACT

Clamping device for fixing a wheel rim of a vehicle wheel to the shaft of a balancing machine. The clamping device comprises a locating flange which is to be fixed on the shaft of the balancing machine and has a locating face for the wheel rim; a clamping flange which is positioned on a shaft journal and can be clamped against the locating flange; centering bolts which are concentrically arranged on the clamping flange around its circumference and at equal distances from each other and at their ends facing the locating flange each has a centering cone designed to engage fixing and centering holes in the wheel rim of the vehicle wheel; and pivots which axially protrude outwards from the centering cone. A circular groove is arranged in the locating face of the locating flange. The width of the circular groove corresponds to the diameter of the pivots and the mean radius of the circular groove corresponds to the radial distance of the centering bolts to the axis of rotation of the shaft of the balancing machine.

6 Claims, 1 Drawing Sheet

CLAMPING DEVICE FOR FIXING A WHEEL RIM OF A VEHICLE WHEEL TO A SHAFT OF A BALANCING MACHINE

CROSS REFERENCE TO RELATED APPLICATIONS

This application is a continuation of International Application No. PCT/EP99/05379, filed Jul. 27, 1999, and which claims the priority of German Application No. 198 33 879.1, filed Jul. 28, 1998, and each of which is incorporated herein by reference.

FIELD OF THE INVENTION

The invention pertains to a clamping device for fixing a wheel rim of a vehicle wheel to a shaft of a balancing machine.

More particularly, the invention relates to a clamping device of the type such as described in the preamble of claim 1; e.g., of the type as described in DE-OS 1 928 054, which is incorporated herein by reference.

BACKGROUND OF THE INVENTION

DE 28 07 343 A1 describes a clamping device in which the centering bolts that are referred to as pins in this publication contain a longitudinal cavity. Pins that are pre-stressed by means of springs are displaceably arranged in these longitudinal cavities, with the ends of said pins respectively protruding in the axial direction from the centering cone. A wheel rim of a vehicle wheel should be suspended on and consequently pre-centered on the ends of the pins such that the centering bolts can respectively engage into and center the mounting holes of a wheel rim with their centering cone when the clamping flange is tightened against the locating flange.

The centering bolts are connected to the clamping flange by means of screws such that they can be exchanged. Due to mounting tolerances as well as the resilience of the centering bolts, inaccuracies in the radial position of the centering cones on the ends of the centering bolts may occur such that a precise centering of a wheel rim is no longer possible.

This disadvantage becomes particularly evident if the rear ends of the centering bolts are provided with pins that can be inserted into different holes in the clamping flange in accordance with the different hole arrangements in wheel rims, e.g., as it is the case with another clamping flange that is available on the market (company pamphlet "Typenspannflansche" of the firm HAWEKA Auswuchttechnik Horst Warkotsch GmbH, 30928 Burgwedel, Impressum (e.g., reprint no.) 304-10/94-1000/2D). In this case, a certain play between the centering bolts and the clamping flange is unavoidable, i.e., centering errors are also unavoidable.

A clamping device of the type described in the preamble of Claim 1 is known from the initially mentioned DE-OS 1 928 054. In this case, openings are arranged in the locating face of the locating flange, with the inside dimension of said openings corresponding to the diameter of the pins, and with the average radial distance of said openings from the rotational axis of the shaft of the balancing machine corresponding to the radial distance of the centering bolts from the rotational axis of the shaft of the balancing machine. However, this known clamping device is not suitable for wheel rims with different hole arrangements.

OBJECTS AND SUMMARY OF THE INVENTION

The invention is based on the object of developing a clamping device of the pertinent type which can be used for different hole arrangements and in which the risk of centering errors is reduced.

According to the invention, this object is attained with the characteristics disclosed in the characterizing portion of Claim 1.

The basic idea of the invention consists of counteracting the possible radial inaccuracies in the radial position of the centering cones on the ends of the centering bolts by centering the ends during the clamping process due to their engagement into an annular groove in the locating flange, and thusly inaccuracies in the position of the centering bolts are corrected. The annular groove is simultaneously able to exactly center centering bolts of different hole arrangements that, however, have the same radial position.

According to one practical additional development of the invention, the centering bolts can be conventionally inserted into bores in the clamping flange. In this application of the known principle, the advantage of the invention can be seen in the fact that the tolerances in the plug-type connection can be significantly higher without causing centering errors.

BRIEF DESCRIPTION OF THE DRAWING

The invention is described in greater detail below with reference to one preferred embodiment that is illustrated in the figure.

DETAILED DESCRIPTION OF THE PREFERRED EMBODIMENTS

Figure 1:
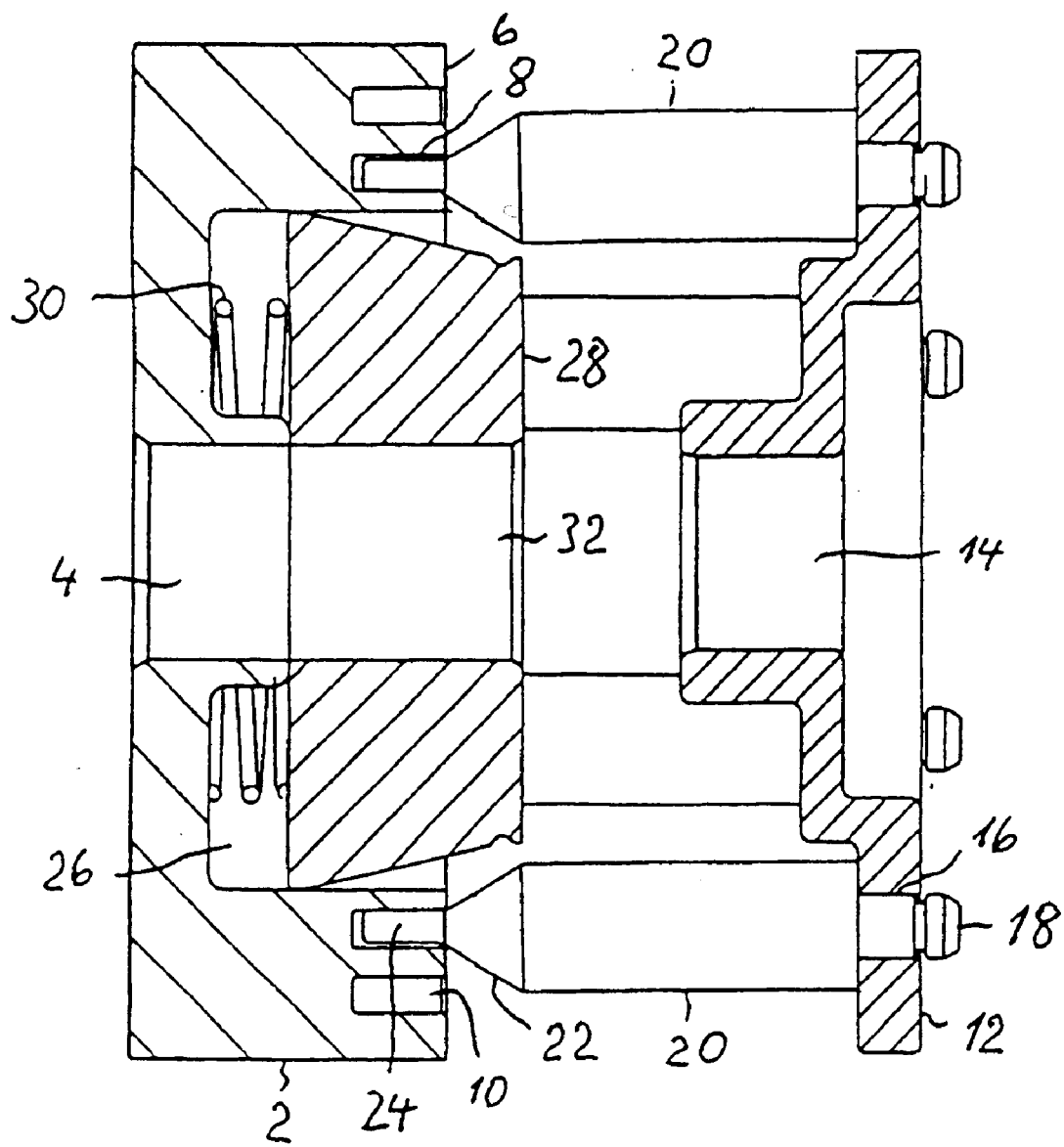

One preferred embodiment of a clamping device according to the invention which is illustrated in the figure contains a locating flange 2 with a central bore 4 that serves for mounting the clamping device on an unillustrated shaft of a balancing machine. The locating flange 2 contains a locating face 6 that serves for supporting an unillustrated wheel rim of a vehicle wheel. Annular grooves 8 and 10 of different diameters which correspond to the different diameters of centering holes of wheel rims to be fixed to the balancing machine are arranged in the locating face 6.

The clamping device also contains a clamping flange 12 with an axial bore 14, the diameter of which is precisely as large as the diameter of the bore 4 and consequently makes possible pushing of the clamping device onto the shaft of a balancing machine.

The clamping flange 12 contains bores 16, the radial distance of which from the center line of the bore 14 exactly corresponds to the radial distance of the center line of the annular groove 8. Holding pins 18 of centering bolts 20 are inserted into the bores 16. On their ends which face away from the clamping flange 12, the centering bolts respectively contain a centering cone 22, from which one respective pin 24 protrudes. In the position shown, these pins engage into the annular groove 10 and consequently are precisely positioned in the radial direction. The radial positions of the centering cones 22 which are decisive for the centering of a wheel rim are also exactly centered in this fashion. The centering cones 22 engage into the mounting and centering holes of the wheel rim when the clamping flange 12 is tightened against the locating flange 2 by means of an unillustrated clamping screw.

The locating flange 2 contains a cavity 26 that is open toward the locating face 6, with a centering cone 28 that is preloaded or biased in the direction toward the clamping flange 12 by a spring 30 being arranged in said cavity. The centering cone 28 contains a bore 32 that has the same diameter as the bores 4 and 14 such that the centering cone 28 can be displaced on the shaft of a balancing machine. The centering cone 28 serves for engaging into a central hole of a wheel rim of a vehicle wheel, but not for precisely centering the wheel rim if the central hole of the wheel rim is not realized in the form of a centering hole. In addition, a certain play between the centering cone 28 and the shaft of a balancing machine is unavoidable such that centering errors may also occur.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. Clamping device for fixing a wheel rim of a vehicle wheel to a shaft of a balancing machine, comprising:
   a) a locating flange containing a locating face for the wheel rim and which can be fixed to the shaft of the balancing machine,
   b) a clamping flange arranged on a shaft journal and can be tightened against the locating flange,
   c) centering bolts concentrically arranged on the clamping flange at uniform circumferential intervals and respectively contain a centering cone that serves for engaging into mounting and centering holes in the wheel rim of the vehicle wheel on their ends that faces the locating flange,
   d) pins that respectively protrude axially from the centering cone,
   e) the locating face of the locating flange containing openings, the inside dimension of which openings correspond to the diameter of the pins and the average radial distance of which openings from the rotational axis of the shaft of the balancing machine corresponds substantially to the radial distance of the centering bolts from the rotational axis of the shaft of the balancing machine, and
   f) the openings are substantially in the form of an annular groove the width of which annular groove corresponds to the diameter of the pins and the average radius of which annular groove corresponds to the radial distance of the centering bolts from the rotational axis of the shaft of the balancing machine.

2. Clamping device according to claim 1, wherein:
   a) the centering bolts can be inserted into bores in the clamping flange.

3. Clamping device according to claim 1, wherein:
   a) at least two annular grooves with different average radii are provided.

4. Clamping device for fixing a wheel rim of a vehicle wheel to a shaft of a balancing machine, comprising:
   a) a locating flange containing a locating face for the wheel rim and which can be fixed to the shaft of the balancing machine,
   b) a clamping flange arranged on a shaft journal and can be tightened against the locating flange,
   c) centering bolts concentrically arranged on the clamping flange at uniform circumferential intervals and respectively contain a centering cone that serves for engaging into mounting and centering holes in the wheel rim of the vehicle wheel on their ends that faces the locating flange,
   d) pins that respectively protrude axially from the centering cone,
   e) the locating face of the locating flange containing openings, the inside dimension of which openings correspond to the diameter of the pins and the average radial distance of which openings from the rotational axis of the shaft of the balancing machine corresponds substantially to the radial distance of the centering bolts from the rotational axis of the shaft of the balancing machine, and
   f) the openings are substantially in the form of an annular groove.

5. Clamping device according to claim 4, wherein:
   a) the centering bolts can be inserted into bores in the clamping flange.

6. Clamping device according to claim 4, wherein:
   a) at least two annular grooves with different average radii are provided.

* * * * *